United States Patent [19]

Breuil et al.

[11] Patent Number: 4,981,494

[45] Date of Patent: Jan. 1, 1991

[54] WATER-RESISTANT FUEL AGGLOMERATE, PROCESS FOR PREPARING IT AND COMPOSITION OF MATTER EMPLOYED IN THE PROCESS

[75] Inventors: Dominique Breuil, Vieille Chapelle; Jean-Pierre Graux, Lillers; Serge Gosset, Lestrem, all of France

[73] Assignee: Roquette Freres, Lestrem, France

[21] Appl. No.: 295,695

[22] Filed: Jan. 10, 1989

[30] Foreign Application Priority Data

Jan. 11, 1988 [FR] France .................................. 88 00219

[51] Int. Cl.$^5$ ................................................. C10L 5/14
[52] U.S. Cl. ......................................... 44/560; 44/554; 44/559; 44/563
[58] Field of Search .............. 44/15 C, 26, 15 R, 16 R

[56] References Cited

U.S. PATENT DOCUMENTS 1,995,366  3/1935  Snell .......................................... 44/26
4,260,395  4/1981  Anderson ................................. 44/26

FOREIGN PATENT DOCUMENTS 11989  of 1928  Australia .............................. 44/15 C
3445503  6/1986  Fed. Rep. of Germany .......... 44/26

OTHER PUBLICATIONS

Noll, W., "Chemi und Technologie der Silicone", Neubearbeitete und Wezentlich Erwerterte Auflage, 523–526 (W. Germany 1968).

*Primary Examiner*—Carl F. Dees
*Attorney, Agent, or Firm*—Fleit, Jacobson, Cohn, Price, Holman & Stern

[57] ABSTRACT

A water-resistant fuel agglomerate based on finely divided fuel material, is characterized by the fact that it comprises, distributed within its constituent mass, effective proportions respectively of at least one organic binder selected from the group comprising starches, starch derivatives, flours, proteins, celluloses, hemicelluloses as well as the mixture of these substances, and of at least one organosilicic waterproofing or water-repelling agent.

12 Claims, No Drawings

WATER-RESISTANT FUEL AGGLOMERATE, PROCESS FOR PREPARING IT AND COMPOSITION OF MATTER EMPLOYED IN THE PROCESS

The invention relates to a water-resistant fuel agglomerate.

It is aimed also at a process for preparing it and a composition of matter employed in this process.

By the expression "fuel agglomerates", is meant any physical presentation of finely divided fuel materials easily handable and usable for domestic or industrial purposes. By way of example may be mentioned coal balls, briquettes and pellets.

The finely divided fuel materials concerned by the present invention ay be any substances rich in carbon like for example coal fines or dusts, wood charcoal fines, coal coke fines, petroleum coke fines or a mixture of these products. These materials and in particular the fines and dusts of coal are produced in large quantity by modern extraction and washing processes, particularly of coal.

Among the value-enhanced uses of these materials, may be mentioned especially their use in the form of fuel agglomerates.

Various agglomeration techniques of these fines or dusts, generally employing additives or binders suitable for ensuring sufficient cohesion, have already been proposed.

Among these additives or binders, the most currently employed are pitch from coal, from wood or from petroleum, bitumen, lignosulfonates, clay and polysaccharides, among which are in particular starches and starch derivatives.

The most used of these binders is uncontestably pitch from coal, but the exigencies of protection of the environment becoming more and more strict, its use today is experiencing a certain recession.

In fact, its use makes it necessary to submit the agglomerates so obtained to thermal or smoke removal treatment in order to lower the concentration of phenolic compounds. Now, this treatment results in a not negligible atmospheric pollution. In addition, the smoke removal not being complete, the combustion of these agglomerates at the time of their use causes a release of smoke which is harmful to man.

These drawbacks had led certain countries to forbid the use thereof.

The drawbacks inherent in the use of pitch are found again in the employment of bitumen as a binder.

To overcome these drawbacks, it has been proposed to resort, as a binder, to lignosulfonates, in particular of ammonium.

The scientific literature relating to the use of these products is extremely abundant and there may be mentioned by way of example, SU Pat. Nos. 983,147, 1,010,146 and 1,137,103, the patent Nos. EP No. 0,097,486 and DE No. 3,227,395 or again patents DD No. 224,331 and U.S. No. 4,666,522.

It happens that the technique of agglomeration with lignosulfonates is complex and its performance necessitates considerable know how.

It is in fact necessary, on the one hand, to dry the fines to a precise moisture content so that the lignosulfonates-fines mixture may be agglomerated, an excess or a lack of water rendering this operation impossible, on the other hand, to polymerize the lignosulfonates according to a perfectly defined temperature curve in order to insolubilize them and thus confer on the agglomerates a good behavior to water.

Now, the duration of the latter heat treatment can extend to 3 hours and the temperatures required for the insolubilization must be high and particularly comprised between 270° and 450° C. according to the nature of the lignosulfonates employed.

Consequently, this technique is laborious from the point of view of energy. In addition, it is also a non-negligible cause of atmospheric pollution.

In fact, during the heat treatment, there occurs a release of harmful fumes rich in sulfuric acid.

It has been proposed to resolve this pollution problem by making different modifications in the plants concerned, and especially by providing devices for condensation of the smoke. However such devices have only had the consequence of displacing the pollution problem to a corrosion problem which as is known, is extremely difficult to control, especially when it relates to treating condensates rich in sulfuric acid, even by employing special steels as a constituent material of the agglomeration plants.

In any event and whatever the solutions envisaged, the drawbacks associated with the utilization of lignosulfonates make it a laborious technique as already stressed above.

In addition, the agglomerates manufactured according to this technique present the drawback of generating, during their combustion, sulfur residues which are to be found again particularly in the smoke.

There have been proposed processes not having the above-mentioned drawbacks associated with pitch, with tar and with lignosulfonates, in which these binders are replaced by clays and particularly by bentonite (U.S. Pat. No. 4,025,596 and DE No. 1,671,365). However, the agglomerates obtained according to these techniques do not present all the required physical characteristics; in particular, their mechanical strength is insufficient and their water behavior mediocre. It follows that these processes have not been developed in practice.

It has also been proposed to resort, as a binder, to starch which, employed alone or in admixture with other binders, as taught, for example, by patent Nos. U.S. No. 3,726,652 and DE No. 3,227,395 or again patent EP No. 0,097,486, has many advantages.

A comparative study on pelletization made in 1982 at the University of Berkeley (thesis of K. V. S. SASTRY and D. W. FUERSTENAU), has shown that, relative to an asphalt emulsion, or to bentonite, starch resulted in better results on the scores of:

mechanical compressive strength, abrasion resistance, impact resistance.

In addition and contrary to the lignosulfonates, starch does not necessitate a particular precaution as regards moisture of the fines-binder pre-mix before the agglomeration step proper.

In addition, starch may be used without limitation in industrial plants initially designed for use with pitch or with bitumen which are the binders most used at present, its employment hence not necessitating an additional investment; in addition, plant maintenance is reduced.

Finally, combustion of the starch-bonded agglomerates does not generate a toxic and/or polluting smoke.

However, and this constitutes a major drawback, starch based agglomerates just like those based on bentonite show a very marked sensitivity to water, rendering their storage in the open air impossible.

It has been proposed, to overcome this drawback, to associate the starch with pitch, with asphalt or with bitumen or again to insolubilize the starch with resins of the urea, phenol-formaldehyde, melamine-formaldehyde, ketone-formaldehyde type or their mixture.

None of these solutions is entirely satisfactory since all reintroduce the problem of release of toxic and polluting fumes during the combustion of the agglomerates thus obtained.

It has also been proposed to coat the agglomerates with a waterproof foil or film obtained by application of an emulsified wax. Although original, such a solution is laborious through the amounts of wax employed and the protection against moisture so conferred on the agglomerates may be altered if these agglomerates undergo, during their transportation, shocks resulting in a deterioration of the protective film.

It has finally been proposed (see patent FR No. 2,118,741) to treat fuel agglomerates with beetroot molasses or with sulfite lyes and with an alkali salt of methylsilicic acid; but it is found that the agglomerates so treated are not satisfactory since they do not show a resistance to water throughout.

Consequently, none of the existing processes enable the obtaining, under economically and ecologically acceptable conditions, fuel agglomerates having simultaneously mechanical properties and water behavior which are satisfactory.

It is therefore an object of the invention to overcome the drawbacks of the prior art and to provide a fuel agglomerate responding better to the various exigencies of practice than those already existing.

Applicants have had the merit of discovering that this object is achieved when fuel agglomerates of the type concerned comprise, distributed within their constituent mass, on the one hand, an organic binder selected from the group comprising starches, starch derivatives, flours, proteins, celluloses, hemicelluloses and mixtures of these substances and, on the other hand, an organosilicic waterproofing or water-repelling agent.

Consequently, the water-resistant fuel agglomerate based on finely divided fuel material according to the invention is characterized by the fact that it comprises, distributed within its constituent mass, effective proportions respectively of at least one organic binder selected from the group comprising starches, starch derivatives, flours, proteins, celluloses, hemicelluloses as well as mixtures of these substances and at least one organosilicic water-repelling agent.

By effective proportion is meant that sufficient to obtain the desired effect.

According to an advantageous embodiment of the agglomerate according to the invention, the organic binder is starch or a starch derivative.

According to another advantageous embodiment of the agglomerate according to the invention, the organosilicic waterproofing agent is a compound whose structural unit is represented by the formula:

in which R and $R_1$, which may be identical or different from one another, are hydrogen or organic radicals selected from the group comprising methyl, alkyl, fluoroalkyl, phenyl possibly substituted, vinyl or their chlorinated derivatives, alcoxy, acyloxy and alkylamino radicals, said compound being advantageously selected from the group comprising non-reactive silicone oils, silicone resins, reactive silicone oils, especially hydroxylated, alkylated, arylated, hydroalkylated, or hydroarylated as well as mixtures of these substances and the emulsions which can be prepared from these substances.

According to another advantageous embodiment of the agglomerate according to the invention, the organosilicic water-repelling agent is selected from the group of siliconates of the general formula:

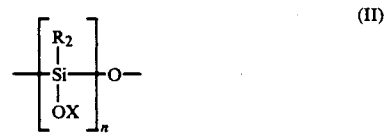

in which $R_2$ is an alkyl ($C_1$–$C_{10}$), alkenyl ($C_1$–$C_{10}$) or aryl ($C_1$–$C_{10}$) group, X is an atom of alkali or alkaline-earth metal and $1 \leq n \leq 10$, potassium siliconate being preferred.

When the organic binder entering into the constitution of the agglomerate according to the invention is a starch or a starch derivative, there is meant by these terms, as regards the starch, native starchs of any origin, natural or hybrid coming, for example, from potato, from manioc, corn, waxy corn, corn with high amylose content, wheat and fractions which may be made therefrom, from barley and sorghum.

as regards the starch derivative, physically and/or chemically modified starches.

Advantageously, the organic binder is a native starch possibly rendered soluble in cold water by a physical treatment of cooking-extrusion and/or gelatinization on a drum.

With respect to the weight of finely divided fuel materials, the agglomerate according to the invention comprises advantageously;

a proportion of 0.2 to 25% by weight of organic binder, preferably from 1 to 15% by weight and, more preferably still, from 2 to 7% by weight.

a proportion of 0.005 to 5% by weight of organosilicic waterproofing agent, preferably from 0.025 to 1.5% by weight and, more preferably still, from 0.05 to 0.5% by weight.

The agglomerate according to the invention may possibly comprise other constituents like for example carbonates, quick or slaked lime, dolomite, alkali silicates, clays, latices, borax, polyphosphates, phosphates, concentrated milk and/or whey, cement, polyvinyl alcohols and thermosetting resins. The proportion of these constituents may reach 15% by weight with respect to the weight of finely divided materials; the granulometric distribution of these constituents must preferably be close to that of the finely divided material.

And the granulometry of this finely divided fuel material which represents the essential constituent in proportion by weight of the agglomerate according to the invention, is generally comprised between about 1 μm and about 1 cm.

The process according to the invention for preparing the agglomerate according to the invention is characterized by the fact:

that a finely divided fuel material, an organic binder of the group defined above and an organosilicic waterproofing agent are selected, that the waterproofing agent is mixed with either the fuel material, or the organic binder, or one and other of these substances or their mixture, that the mixture thus obtained is subjected to an agglomeration treatment.

According to an advantageous embodiment of the process according to the invention, only a part of the waterproofing agent is mixed with either the fuel material, or the organic binder, or with one and other of these substances or their mixture, the other portion of the waterproofing agent being applied to the product resulting from the agglomeration treatment.

According to an another advantageous embodiment of the abovesaid process, a composition of matter comprising the organic binder and at least a portion of the organosilicic waterproofing agent is prepared, an intimate admixture is formed of the finely divided fuel and of this composition of matter and this mixture is subjected to the agglomeration treatment, the eventuel portion of waterproofing agent not comprised by the composition of matter being, for example, applied to the product resulting from the agglomeration treatment.

The composition of matter employed in this advantageous embodiment of the process according to the invention constitutes, within the scope of this particular application, a novel industrial product.

According another embodiment of the process according to the invention, the agglomerate obtained at the end of the agglomeration treatment is subjected to a stoving treatment under temperature conditions generally comprised between about 80°-100° C. and about 200° C.

According to another advantageous embodiment of the process according to the invention, the nature and the properties of the constituents are selected so that the agglomerate obtained has the characteristics indicated above.

In addition, the agglomeration technique employed in the abovesaid process is selected from the group comprising pelletization, pressure-compacting, extrusion and molding; these techniques are known in themselves and described for example in the patent EP No. 0,097,486.

When a part at least of the waterproofing agent is applied after carrying out the agglomeration treatment, it is possible to incorporate the said agent to the solutions for treatment hereabove disclosed and to apply it directly by dipping, sprinkling or spraying.

In order to increase the abrasion resistance of the agglomerates and thus to limit production of fines during their handling, recourse may be had to a foil or film for protection which is deposited on their surface. The said foil or film for protection may consist of at least one of the products of the group comprising acrylic derivatives, polyvinyl alcohol, alkali silicates, phosphate salts, cellulosic derivatives, styrene-butadiene resins and sulfite liquors, being underlined that amylaceous substances and especially native or modified starches and, still more particularly, hydrolyzed or oxidized starches are preferred; advantageously, the said amylaceous substances are made water-resistant by, for example, resins of the type urea-formaldehyde, phenol-formaldehyde, melamine-formaldehyde, ketone-formaldehyde and their mixtures.

The fuel agglomerate according to the invention besides having a set of high mechanical properties, at least equal to those of the agglomerates according to the prior art, has a remarkable resistance to water.

The invention will still be better understood by means of the examples which will follow and which relate to advantageous embodiments.

EXAMPLE 1

Balls based on coal dust

Into a kneader are introduced, on the one hand, 50 kg of coal dust having a surface humidity of 2.2%, a granulometry less than 1 mm and, on the other hand, 3 kg of native wheat starch. This mixture is heated to 50° C. and it is then introduced therein 4.5 liters of water. The mixture so obtained is kneaded for a half hour under heating raising the temperature to 90° C.; the surface humidity measured by means of the device known under the name SPEEDY is then 2.3%. The mixture is agglomerated by pressure-compacting on a press of the SAHUT CONREUR type; among the parameters of the treatment are provided the temperature of the mixture which, at the time of agglomeration, is about 70° C., the regulating pressure which is 16.7 $10^5$N/m linear, the speed of the zones of the press which is 5 rpm and the power of the press which is 6 kW.

In this way coal balls are obtained having a sufficient green cohesion to be able to undergo transportation. They are not damaged by a drop from a height of 6 meters and have good mechanical strength after one hour of drying at ambient temperature.

The strength of these balls, determined by means of a counterpoised compressiometer developed by the SAHUT CONREUR Company has the following values:

| | |
|---|---|
| green | 294.3 N |
| after 24 hours drying at ambient temperature | 686.7 N |
| after stoving for one hour at 100° C. and for one hour at 130° C. | 1765.8 N |

These balls are then immersed in cold water. It is observed that they break up very rapidly. After some minutes, the agglomerate no longer shows any cohesion.

These results illustrate that it is possible, by using only a binder of the amylaceous type, to produce agglomerates of coal dust having good mechanical properties but no resistance to water.

EXAMPLE 2

Balls of coal dust

In a kneader, are intimately mixed 50 kg of coal dust of characteristics identical to those of the dust of example 1 and 3 kg of native wheat starch. The mixture obtained is heated with stirring to a temperature of 50° C. Then 50 grams of waterproofing agent of the RHO- DORSIL SILICONATE 51 T type (potassium siliconate marketed by RHONE-POULENC with about 49% of dry matter) diluted in 5 liters of water are added. This mixture is then kneaded for a half hour bringing the temperature of the mixture to 90° C.; the superficial moisture is then 2.1%. The mixture is then subjected to an agglomeration treatment by pressure-compacting under the same conditions as in example 1.

In this way coal dust balls are obtained having a sufficient green cohesion to be able to withstand transportation. After a drop from a height of 6 meters, they are not damaged; they have good mechanical strength after one hour of drying at ambient temperature.

The strength of these balls, measured as in example 1, has the following values:

| green | 294.3 N |
|---|---|
| up to 24 hours drying at ambient temperature | 784.8 N |
| after stoving for one hour at 100° C. and for one hour at 130° C. | 1962.0 N. |

These balls are then immersed in cold water. No breaking up is observed even after several months of immersion.

The mechanical strength of the balls remains unchanged after their dwell in water and after simple drainage. The interior of the balls does not show any trace of moisture.

This example shows that the addition of 5.6% of native starch and of 0.047% of potasium siliconate by dry weight with respect to the weight of fuel dust, enables agglomerates to be obtained satisfying the exigencies of the technique from the point of view of mechanical strength and of resistance to water.

EXAMPLE 3

Balls of coal dust

To a mixture of coal dust and starch identical with that of example 2 and this under the same conditions, are added 100 g of a silicone emulsion RHODORSIL EMULSION 879 marketed by RHONE-POULENC and the mixture is subjected to the same treatment as the mixture of example 2. Surface moisture is than 1.5%.

In this way coal dust balls are obtained having a sufficient green cohesion to undergo transportation. After a drop from a height of 6 meters, they are not damaged; they have good mechanical strength after one hour of drying at ambient temperature.

The strength of these balls, measured as in example 1, has the following values:

| green | 294.3 N |
|---|---|
| up to 24 hours drying at ambient temperature | 657.3 N |
| after stoving for one hour at 100° C. and for one hour at 130° C. | 1863.9 N |

These balls are then immersed in cold water. No breaking up is observed even after several months of immersion.

Their mechanical strength remains unchanged after their dwell in water and after simple drainage. The inside of the balls does not show any trace of moisture.

This example shows that the addition of 5.6% of native starch and of 0.11% of an organosilicic derivative of the siliconate-reactive oil emulsion type by weight with respect to the weight of fuel dust, enables agglomerates to be obtained satisfying the exigencies of the technique both from the point of view of mechanical strength and of resistance to water.

We claim:

1. Water-resistant fuel agglomerate based on a finely divided fuel material, characterized by the fact that it comprises, distributed within its constituent mass, effective proportions respectively
    of at least one organic binder selected from the group comprising starches, starch derivatives, flours, proteins, celluloses, hemicelluloses and mixtures of these substances, and
    of at least one organosilicic water-repelling agent.

2. Agglomerate according to claim 1, characterized by the fact that the organosilicic waterproofing agent is a compound whose structural unit is represented by the formula:

in which R and $R_1$, which may be identical or different from one another, are hydrogen or organic radicals selected from the group comprising methyl, alkyl, fluoroalkyl, phenyl possibly substituted, vinyl or their chlorinated derivatives, alcoxy, acyloxy and alkylamino radicals, said compound being advantageous selected from the group comprising non-reactive silicone oils, silicone resins, reactive silicone oils, especially hydroxylated, alkylated, arylated, hydroalkylated, or hydroarylated as well as mixtures of these substances and the emulsions which can be prepared from these substances.

3. Agglomerate according to claim 1, characterized by the fact that the organosilicic water-repelling agent is selected from the group of siliconates of the general formula:

in which
    $R_2$ is an alkyl ($C_1$-$C_{10}$), alkenyl ($C_1$-$C_{10}$) or aryl ($C_1$-$C_{10}$) group,
    X is an atom of alkali or alkaline-earth metal and $1 \leq n \leq 10$, potassium siliconate being preferred.

4. Agglomerate according to claim 1, characterized by the fact that the organic binder is
    either a native starch of any origin, natural or hybrid, for example, from potato, from manioc, from corn, from waxy corn, from corn with a high amylose content, fro wheat and from fractions therefrom, from barley and sorghum,
    or a starch derivative constituted by a physically and/or chemically modified starch.

5. Agglomerate according to claim 1, characterized by the fact that the organic binder is a native starch possibly rendered soluble in cold water by a physical treatment of cooking-extrusion and/or gelatinization on a drum.

6. Agglomerate according to claim 1, characterized by the fact that, with respect to the weight of finely divided fuel material, it comprises:
   proportion of 0.2 to 25% by weight of organic binder, preferably from 1 to 15% by weight and, more preferably still, from 2 to 7% by weight,
   a proportion of 0.005 to 5% by weight of organosilicic waterproofing agent, preferably from 0.025 to 1.5% by weight and, more preferably still, from 0.05 to 0.5% by weight.

7. Process for the preparation of a water-resistant fuel agglomerate characterized by the fact
   that there is selected a finely divided fuel material, an organic binder and an organosilicic water-repelling agent,
   that the water-repelling agent is mixed with either the fuel material, or the organic binder, or with one and other of these substances or their mixture,
   that the mixture so obtained is subjected to an agglomeration treatment.

8. Process according to claim 7, characterized by the fact that only a part of the waterproofing agent is mixed with either the fuel material, or the organic binder, or with one and other of these substances or their mixture, the other part of the waterproofing agent being applied to the product resulting from the agglomeration treatment.

9. Process according to claim 7, characterized by the fact that a composition of matter is prepared comprising the organic binder and at least a part of the organosilicic waterproofing agent, an intimate mixture is formed of the finely divided fuel and of this composition of matter and this mixture is subjected to an agglomeration treatment, the possible proportion of waterproofing agent not comprised by the composition of matter being applied to the product resulting from the agglomeration treatment.

10. Process according to claim 7, characterized by the fact that the agglomerate obtained at the end of the agglomeration treatment is subjected to a stoving treatment under temperature conditions generally comprised between about 80°–100° C. and about 200° C.

11. Process according to claim 7, characterized by the fact that the agglomeration technique employed is selected from the group comprising pelletization, pressing-compacting, extrusion and molding.

12. Process according to claim 7, characterized by the fact that, when at least part of the waterproofing agent is applied after carrying out the agglomeration treatment, the procedure is by dipping, by sprinkling or by spraying.

* * * * *